United States Patent [19]
Junius et al.

[11] Patent Number: 5,945,005
[45] Date of Patent: Aug. 31, 1999

[54] FLUID FILTER USING FLOATING MEDIA

[76] Inventors: John H. Junius; Anna H. Junius, both of 79455 Hwy. 1083, Bush, La. 70431

[21] Appl. No.: 08/748,205

[22] Filed: Nov. 12, 1996

Related U.S. Application Data

[63] Continuation-in-part of application No. 08/179,452, Jan. 10, 1994, Pat. No. 5,573,663.

[51] Int. Cl.$^6$ .................................................. B01D 24/46
[52] U.S. Cl. .......................................... 210/786; 210/792
[58] Field of Search ..................................... 210/786, 792, 210/806, 807

[56] References Cited

U.S. PATENT DOCUMENTS

| | | | |
|---|---|---|---|
| 887,069 | 5/1908 | Cotter | 210/274 |
| 2,464,707 | 3/1949 | Montgomery et al. | 210/151 |
| 2,631,727 | 3/1953 | Cichelli | 210/676 |
| 2,866,827 | 12/1958 | Jurgeleit et al. | 210/676 |
| 3,003,641 | 10/1961 | Laughlin | 210/189 |
| 3,193,498 | 7/1965 | Platzer et al. | 210/676 |
| 3,215,624 | 11/1965 | Frazer et al. | 210/676 |
| 3,882,022 | 5/1975 | Lagoutte | 210/189 |
| 3,892,663 | 7/1975 | Wiedenmann | 210/169 |
| 4,009,099 | 2/1977 | Jeris | 210/151 |
| 4,009,105 | 2/1977 | Jeris | 210/151 |
| 4,036,854 | 7/1977 | Chang | 210/274 |
| 4,052,300 | 10/1977 | Mosso | 210/786 |
| 4,197,201 | 4/1980 | Hjelmner et al. | 210/269 |
| 4,198,301 | 4/1980 | Iwatani | 210/274 |
| 4,234,420 | 11/1980 | Turbeville | 210/671 |
| 4,415,454 | 11/1983 | Fuchs | 210/616 |
| 4,416,860 | 11/1983 | Heitkamp et al. | 423/6 |
| 4,547,286 | 10/1985 | Hsiung | 210/738 |
| 4,566,971 | 1/1986 | Reimann et al. | 210/616 |
| 4,576,718 | 3/1986 | Reischl et al. | 210/616 |
| 4,582,600 | 4/1986 | Atkinson et al. | 210/151 |
| 4,608,181 | 8/1986 | Hsiung et al. | 210/786 |
| 4,743,382 | 5/1988 | Williamson et al. | 210/269 |
| 4,842,744 | 6/1989 | Schade | 210/636 |
| 4,898,672 | 2/1990 | Clifft et al. | 210/614 |
| 4,919,815 | 4/1990 | Copa et al. | 210/603 |
| 5,126,042 | 6/1992 | Malone | 210/150 |
| 5,126,056 | 6/1992 | Carlson | 210/676 |
| 5,387,335 | 2/1995 | Iwai et al. | 210/151 |

FOREIGN PATENT DOCUMENTS

| | | |
|---|---|---|
| 120867 | 11/1918 | United Kingdom . |
| 903800 | 8/1962 | United Kingdom . |

OTHER PUBLICATIONS

Denver Equipment Company, 1985, Agitators/Mixers Brochure.

Armant Aquaculture, Armant Aquaculture's Propellor-–Washed Bead Filters.

*Primary Examiner*—Ivars Cintins
*Attorney, Agent, or Firm*—Gravey, Smith, Nehrbass & Doody, L.L.C.

[57] ABSTRACT

A filter system (110) includes a tank (130) with a conveyer (140) for, preferably continuously, conveying filter media (11) from a filter zone (119) in the tank (130) where the filter media (11) traps predetermined matter (16), such as particulates, to a quiet zone (115) in the tank (130) where the predetermined matter (16) separates from the filter media (11) and is allowed to accumulate and be withdrawn from the tank (130). The conveyer (140) preferably includes a screw auger (141) and a duct (142) for containing the screw auger (141). The filter media (11) is preferably buoyant when the fluid (21) being filtered is water.

7 Claims, 13 Drawing Sheets

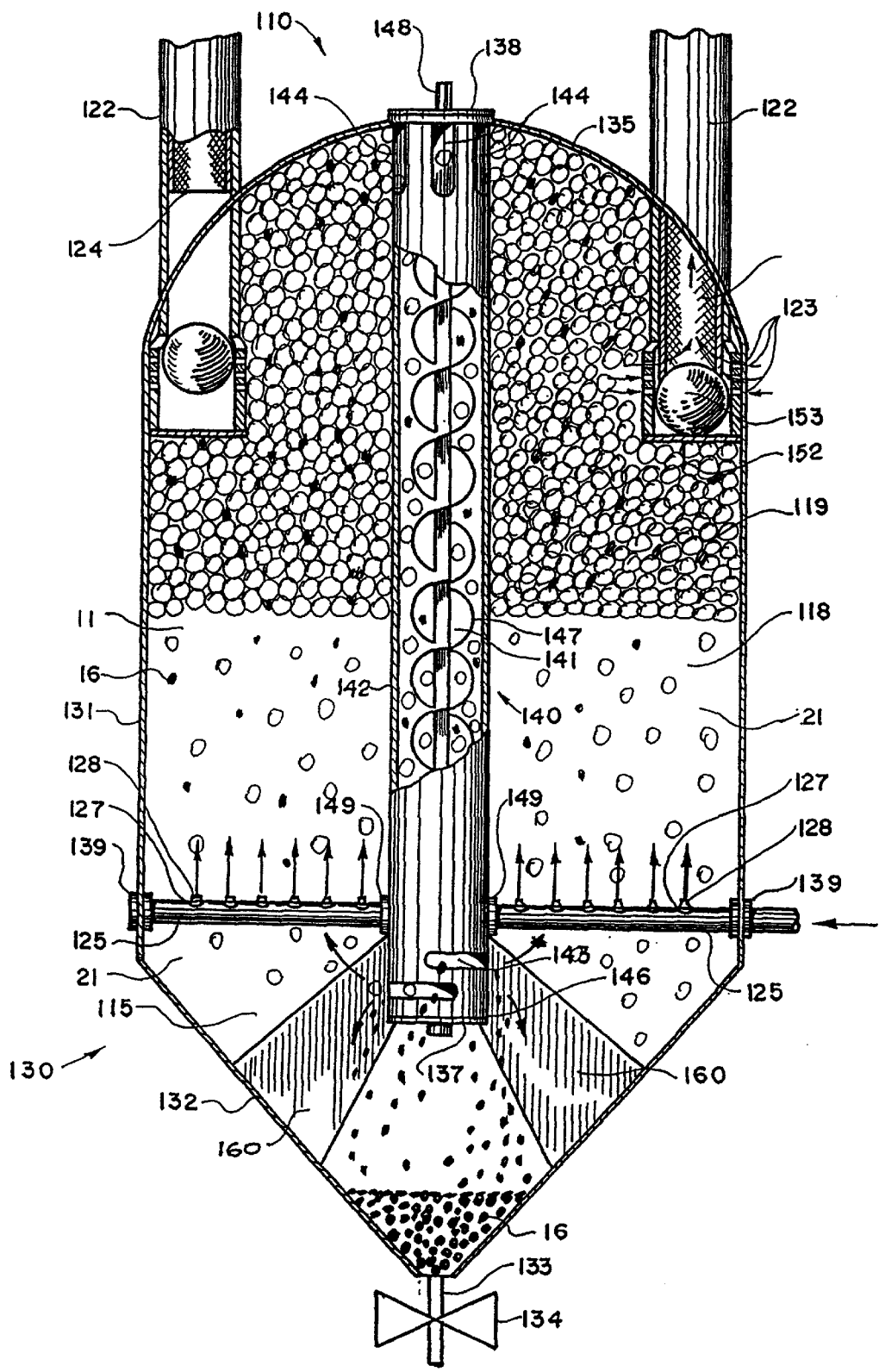
F I G. 3

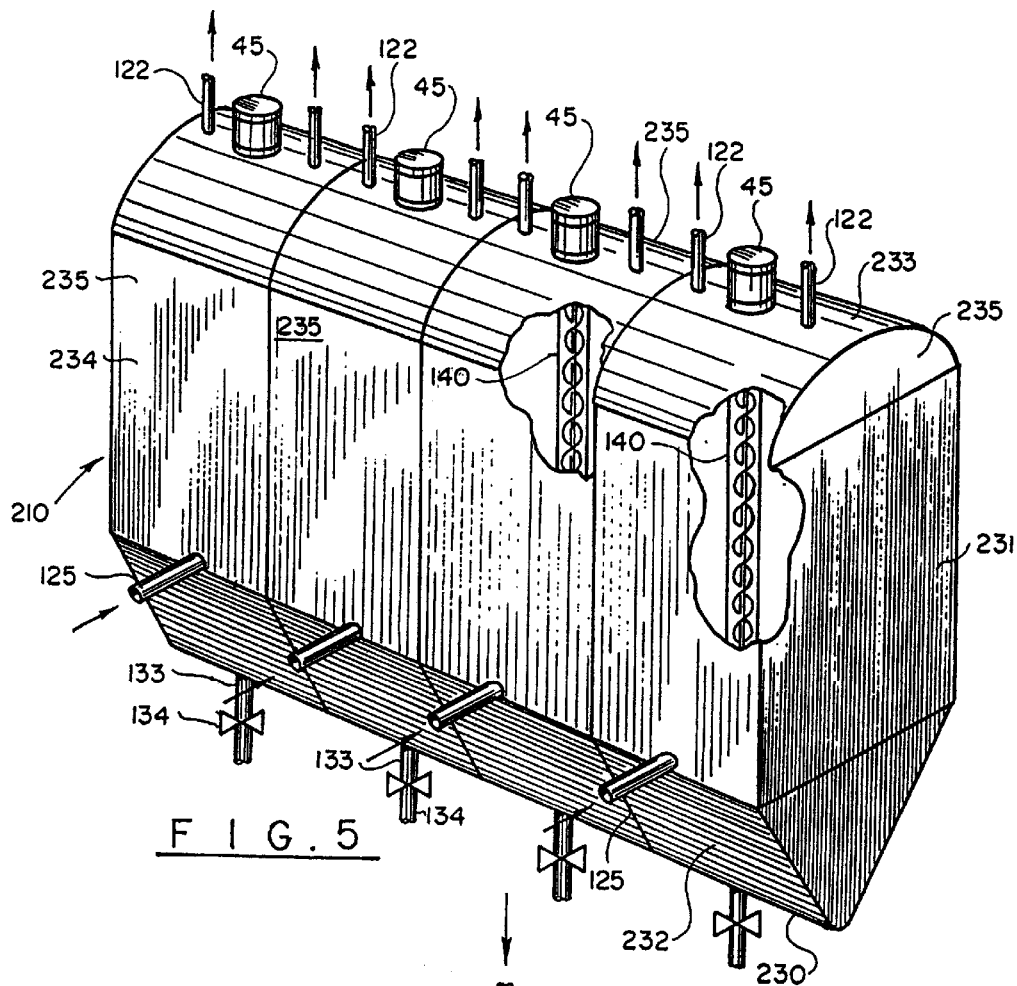
F I G. 5
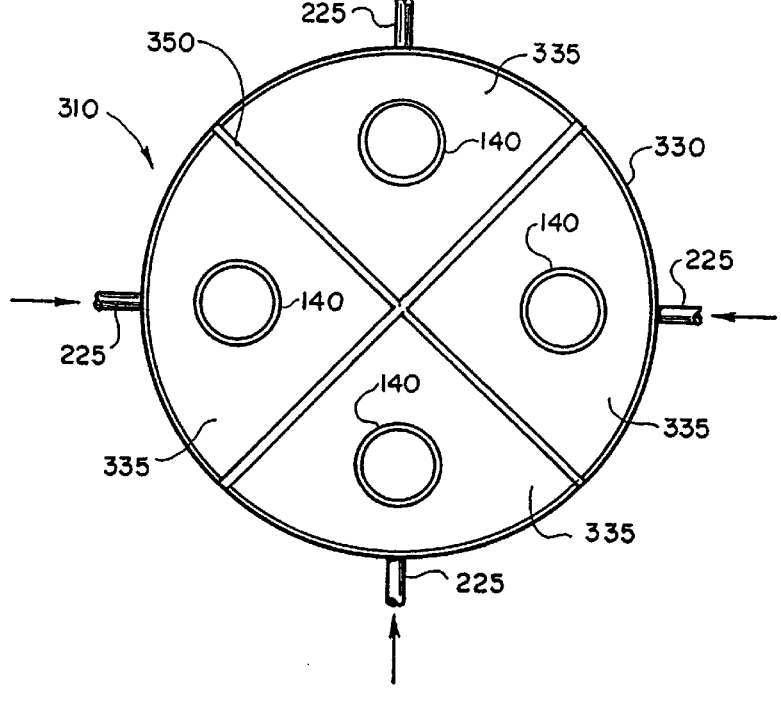
F I G. 6

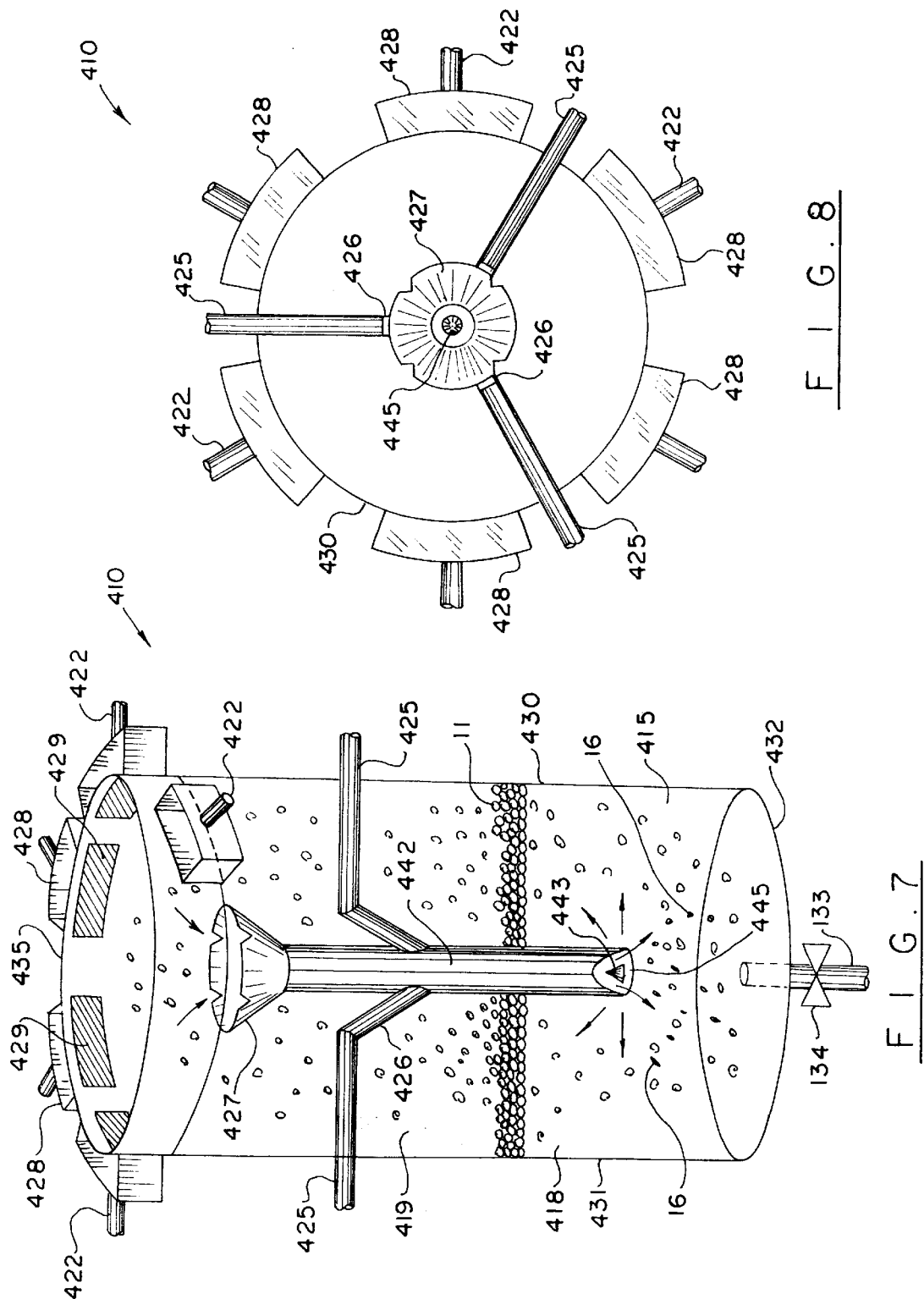

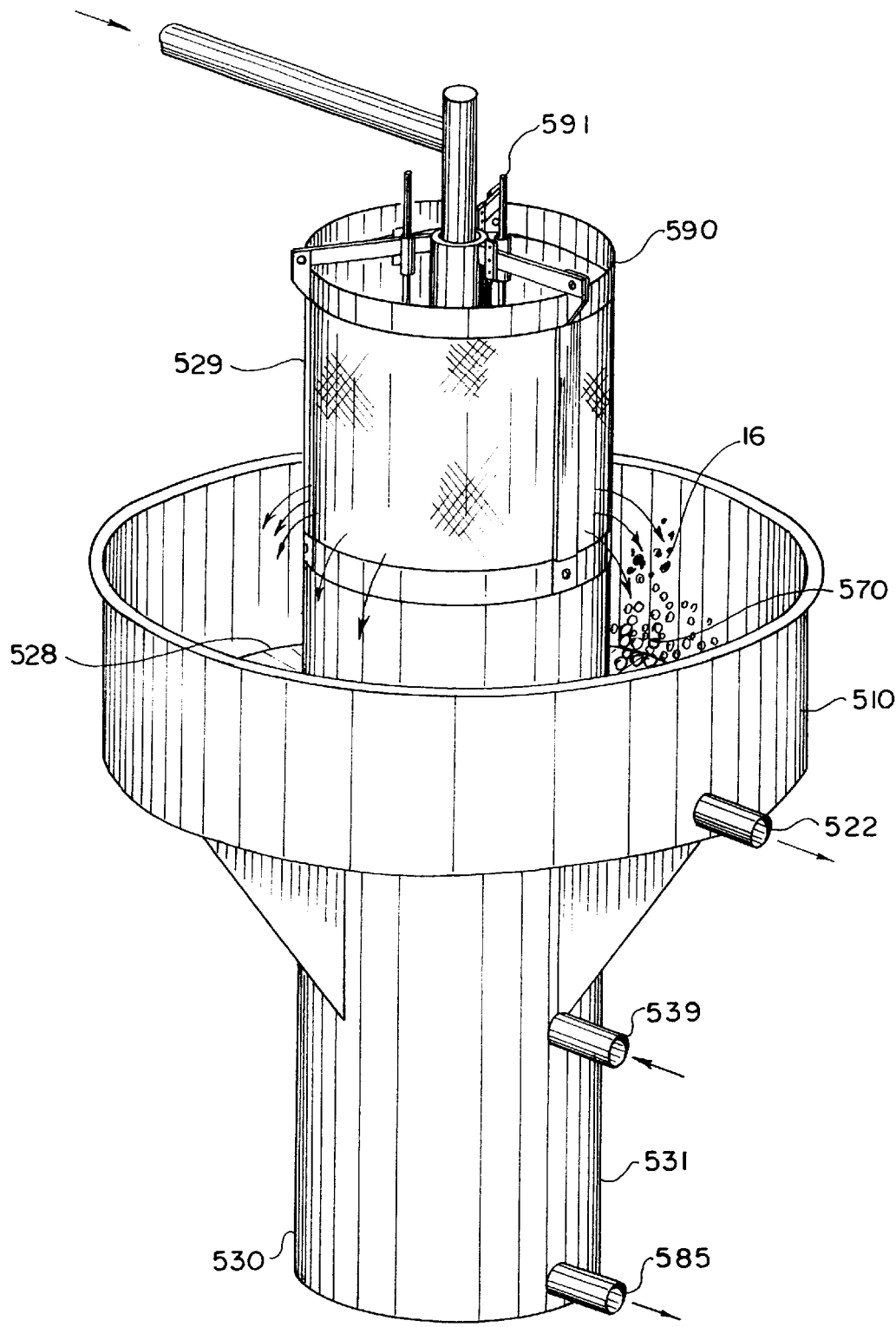
F I G. 9

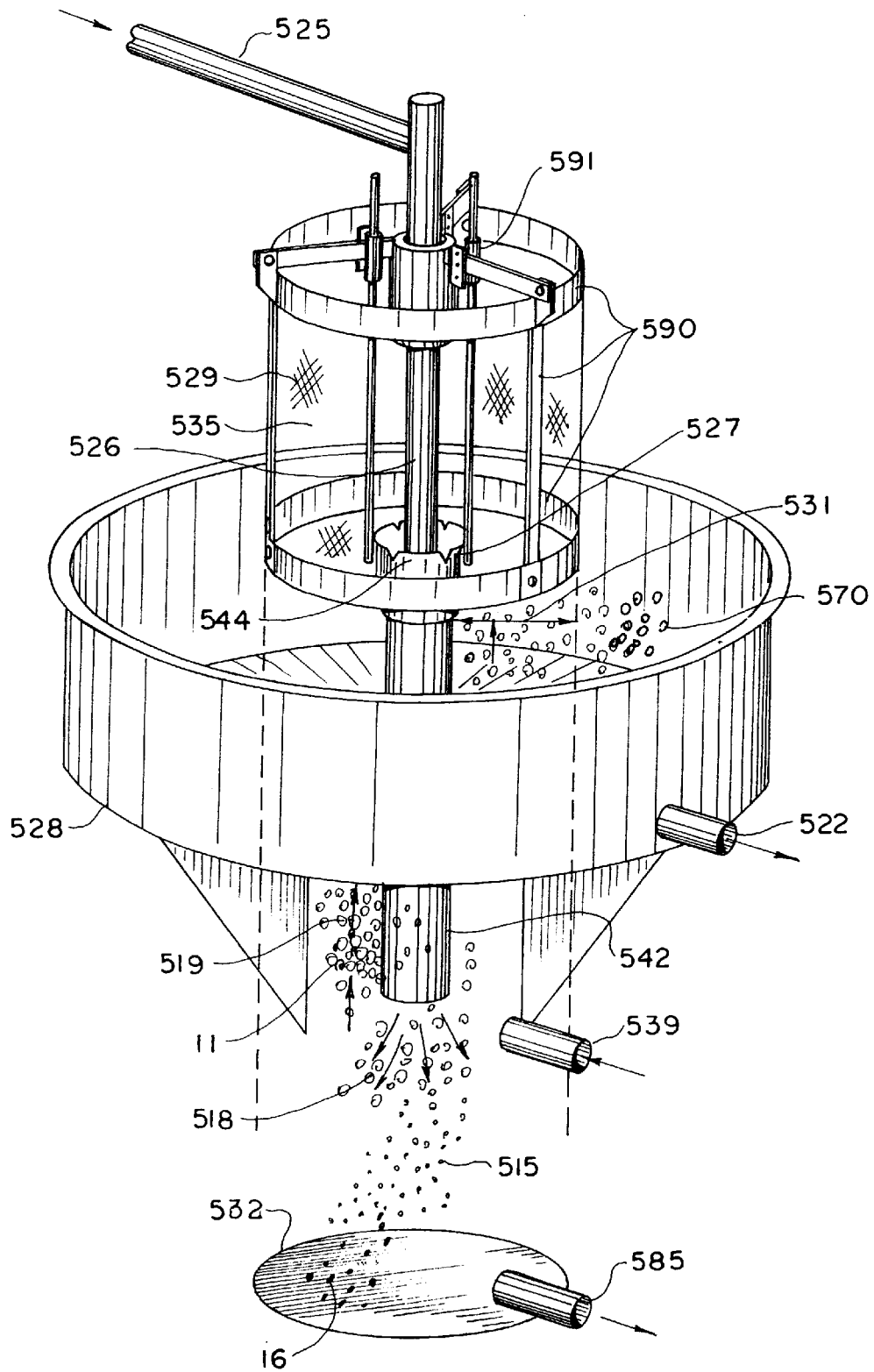
F I G. 10

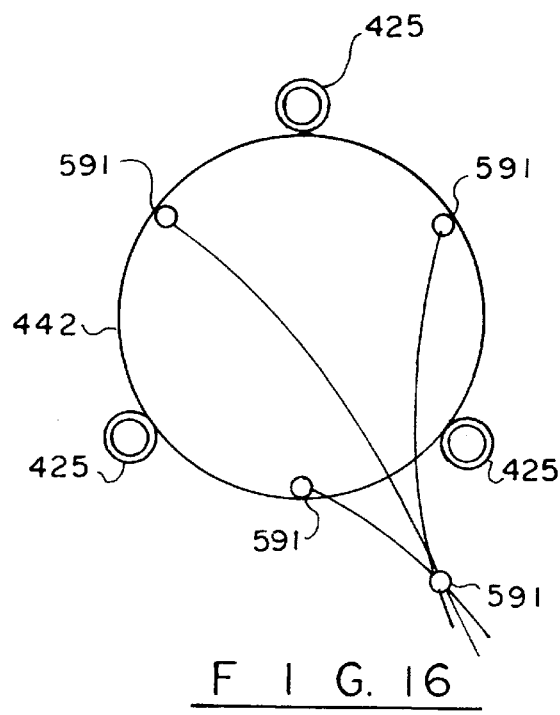
F I G. 16
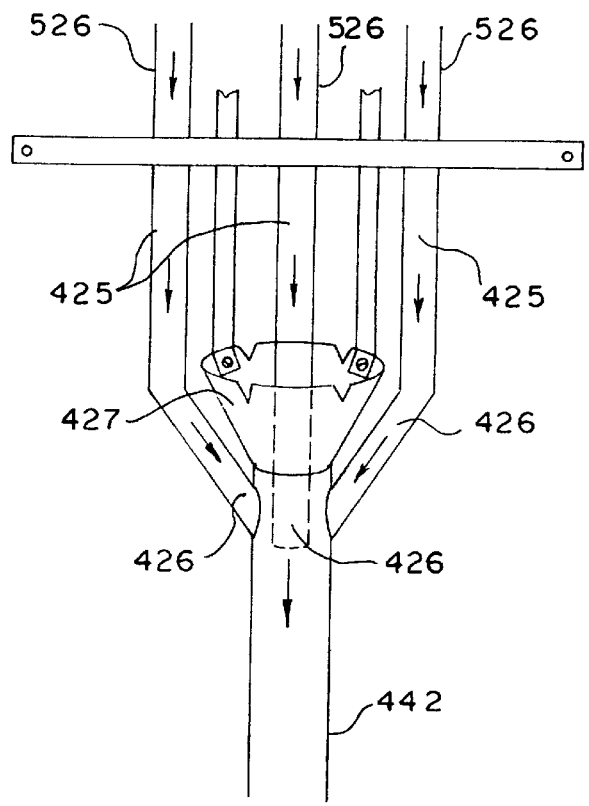
F I G. 17

FLUID FILTER USING FLOATING MEDIA

CROSS-REFERENCE TO RELATED APPLICATIONS

This is a continuation-in-part application of U.S. patent application Ser. No. 08/179,452, filed Jan. 10, 1994, now U.S. Pat. No. 5,573,663, both incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to filters for fluids. More particularly, the present invention relates to a filter system for fluids which utilizes filter media having a density different from the fluid (such as buoyant plastic beads when water is being filtered).

2. General Background of the Invention

In the filtration of fluids, filter media in the form of plastic beads or other particulates, such as diatomaceous earth or sand, is used to trap impurities. Typically, the filter media must be backwashed at predetermined intervals to keep the filter operating smoothly. This backwashing requires that the filter system be shut down, which can be quite inconvenient if continuous filtration is required during processing. If that is the case, then the process must be shut down while the filter is being backwashed, resulting in undesirable loss of production.

U.S. Pat. No. 5,126,042 discloses such a filter. In addition to the problem of needing to shut the system down to backwash the filter, static filters such as the one disclosed in the '042 patent can suffer from tunneling problems. Tunneling occurs when the filter media get clogged or bacterial gel builds up on the media, causing the filter media to stick together. Water breaks tunnels through the filter media and, following the path of least resistance, continues to travel through the tunnels instead of getting filtered by the filter media.

BRIEF SUMMARY OF THE INVENTION

The apparatus of the present invention is a filter system in which backwashing is not necessary, as the filter media is constantly rejuvenated. The apparatus of the present invention comprises a tank means for containing a volume of fluid, an influent means for introducing the fluid into the tank means, an effluent means for allowing filtered fluid to exit the tank means, and filter media for filtering predetermined matter (such as particulates, which may be impurities) out of the fluid. In the tank means there is a filter zone where the filter media is relatively tightly packed, a mixing zone where the filter media is relatively loosely packed, and a quiet zone adjacent the mixing zone, the mixing zone being between the filter zone and the quiet zone. An important feature of the present invention is a conveyer means for conveying filter media from the filter zone to the quiet zone.

Preferably, the filter zone is adjacent the effluent means, the mixing zone is between the influent means and the filter zone, and the quiet zone is below the mixing zone.

When the fluid being filtered is water, the filter media preferably comprises buoyant beads and the conveyer means can comprise a screw auger. When the fluid is water, the predetermined matter usually comprises solid impurities. There is a motor means for turning the screw auger and a duct means for containing the screw auger. The influent means preferably includes pipes which secure the duct means to the wall of the tank means. There is a waste outlet for extracting predetermined matter from the quiet zone.

The conveyer means can be water-powered, as described in the detailed description of the invention, so that the number of moving parts of the invention is reduced. However, the water-powered version ties together the flow rate of water through the filter to the flow rate of beads through the conveyer means.

The effluent means can comprise a plurality of effluent pipes and means for stopping fluid flow out of the tank means through at least one effluent pipe while fluid flows out of the tank means through at least one other effluent pipe.

The filter apparatus can be a part of a system comprising, in addition to the apparatus mentioned above, a fish tank containing live fish and water, the water in the fish tank being the fluid being filtered in the tank means, and the filter media being buoyant in the water. There is preferably also a pump for pumping water from the fish tank to the tank means. In such a case, most of the predetermined matter being filtered would be particulates denser than water.

The method of filtering fluid of the present invention comprises the steps of providing a tank means for containing a volume of fluid, introducing the fluid into the tank means, providing a filter media for filtering predetermined matter out of the fluid, causing the filter media to pack relatively tightly in a filter zone in the tank means, flowing the fluid through the filter zone where predetermined matter in the fluid become trapped in the filter media, flowing the filtered fluid out of the tank means, conveying the filter media and trapped predetermined matter from the filter zone to a quiet zone where the predetermined matter moves away from the filter zone and the filter media move in the direction of the filter zone, and allowing the filter media to move from the quiet zone to a mixing zone where the filter media mixes with predetermined matter in the fluid being filtered.

Preferably, the filter media and trapped predetermined matter are continuously conveyed from the filter zone to the quiet zone. Usually, when the fluid being filtered is water, the trapped predetermined matter comprises particulates which drop to the bottom of the tank means in the quiet zone.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is an elevational sectional view of a second embodiment of the apparatus of the present invention.

FIG. 5 is an elevational, partially cut-away view of a third embodiment of the apparatus of the present invention.

FIG. 6 is a sectional view of a fourth embodiment of the apparatus of the present invention.

FIG. 7 is an elevational, partially cut-away view of the preferred embodiment of the apparatus of the present invention.

FIG. 8 is a sectional view of the preferred embodiment of the apparatus of the present invention.

FIG. 9 is perspective view of another embodiment of the apparatus of the present invention.

FIG. 10 is an exposed view of internal components of the embodiment of FIG. 9.

FIGS. 14, 15, 16 and 17 show hydraulic apparatus which creates the preferably 360 degree vertical/elliptical cycling of filter media in the hydraulically driven filter apparatus of the present invention.

PARTS LIST

Figure 1:
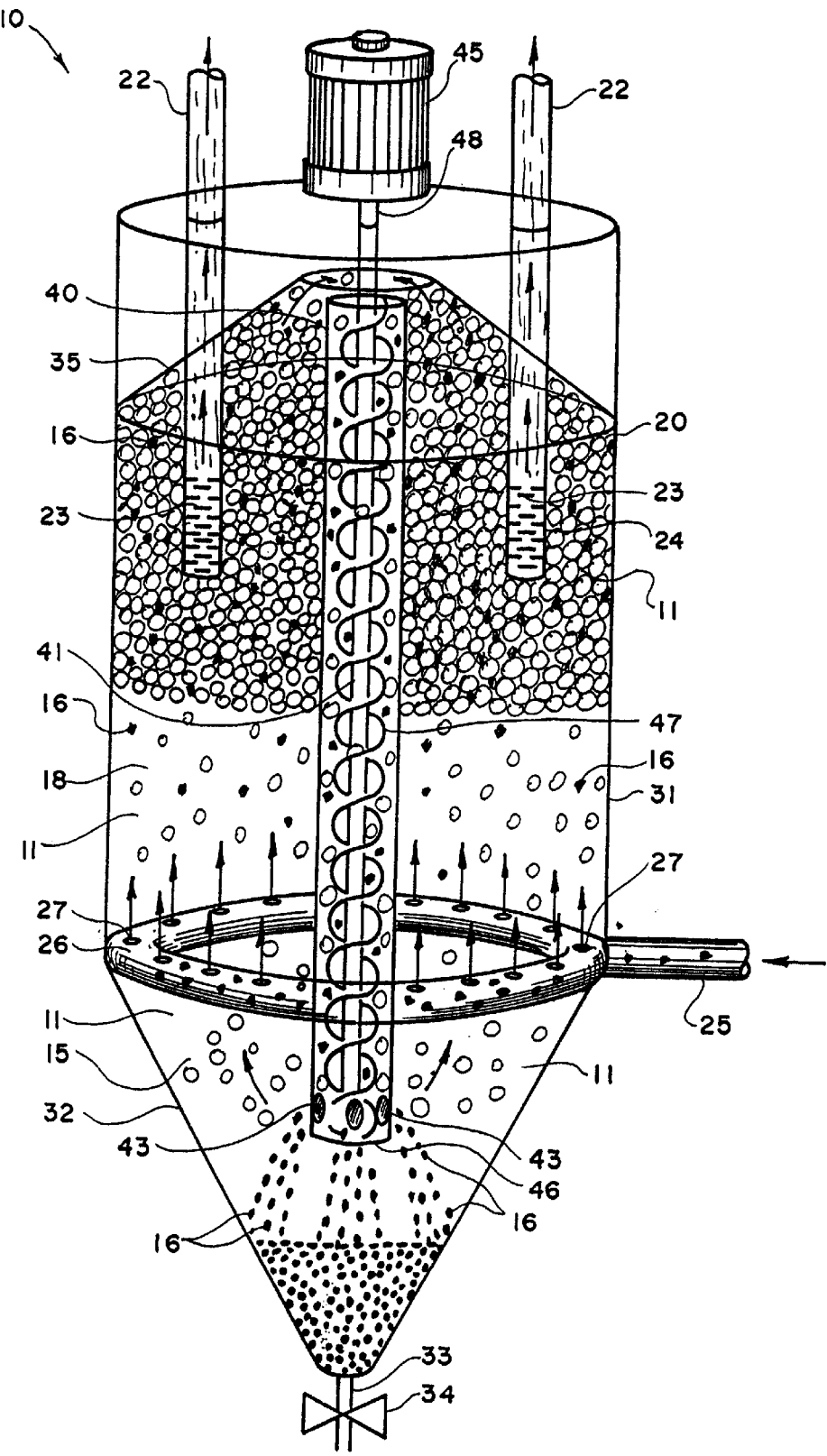
FIG. 1 is an elevational sectional view of a first embodiment of the apparatus of the present invention.
Figure 2:
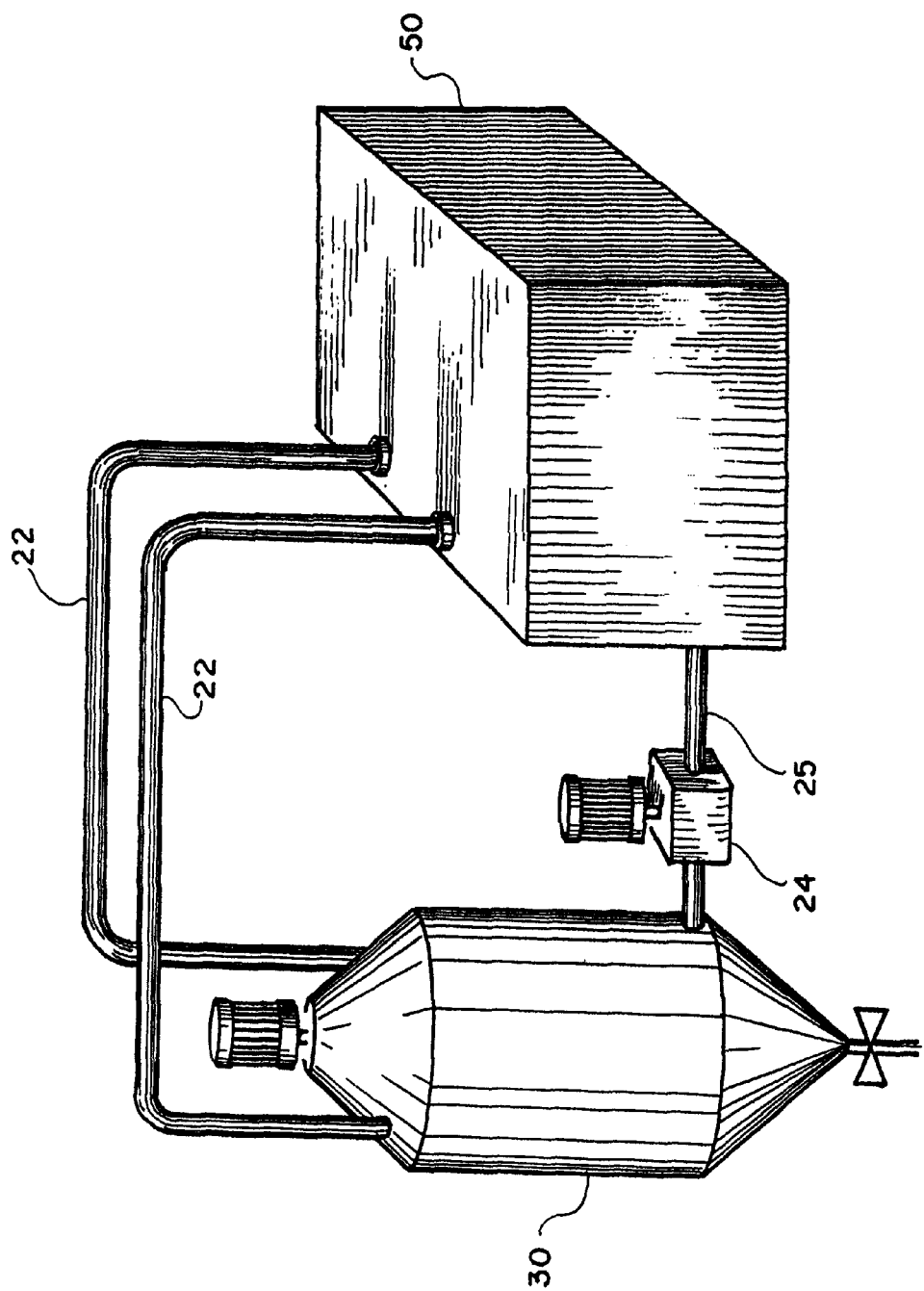
FIG. 2 shows a fish tank system in which the filter apparatus of the present invention is being used.

The following is a list of suitable parts and materials for the various elements of the preferred embodiment of the present invention.
10 filter apparatus of a first embodiment of the present invention
11 buoyant filter media (preferably polypropylene or polyethylene)
15 quiet zone in tank 30
16 particulates to be filtered out of fluid 21
18 mixing zone where particulates 16 and the filter media 11 mix
19 filter zone where particulates 16 become trapped in the filter media 11
21 fluid (e.g., water) to be filtered
22 effluent pipes (could be screen pipe with a closed bottom)
23 filter area of effluent pipes pump
25 influent pipe
26 influent ring
27 exit holes in influent ring 26
30 tank
31 cylindrical wall of tank 30 (stainless steel or fiberglass, e.g.)
32 conical bottom of tank 30
33 waste outlet of tank 30
34 valve for waste outlet 33
35 conical top of tank 30 (filter media control cap)
40 conveyer means
41 auger, preferably 6" or 9" diameter Helicoid Conveyer Screw
42 counter-direction friction duct containing auger 41 (suitable means, not shown, secure it within tank 30)
43 exit holes in the bottom of duct 42
44 entrance of duct 42
45 motor for turning auger 41 (preferably variable-speed)
46 closed bottom of duct 42
47 flighting of auger 41
48 shaft of auger 41
50 fish tank
110 filter apparatus of the second embodiment of the present invention
115 quiet zone in tank 130
118 mixing zone where particulates 16 and the filter media 11 mix
119 filter zone where particulates 16 become trapped in the filter media 11
122 outer effluent pipes
123 filter area of inner pipes 124
124 inner strainer slide pipe
125 influent pipes (schedule 40 PVC or stainless steel)
127 exit holes in influent pipes 125
128 nozzles in exit holes 127 in influent pipes 125
130 tank
131 cylindrical wall of tank 130 (stainless steel or fiberglass, e.g.)
132 conical bottom of tank 130
133 waste outlet of tank 130
134 valve for waste outlet 133
135 dome-shaped top of tank 130 (filter media control cap)
137 nylon bearing plate
138 stuffing box plate
139 threaded fittings for securing pipes 125 to tank 130
140 conveyer means
141 auger, preferably 6", 9", or 12", diameter ½ pitch Interlox Conveyer Screw
142 counter-direction friction duct containing auger 141
143 exit vents in the bottom of duct 142
144 entrance vents in duct 142
146 closed bottom of duct 142 (closed with bearing plate 137)
147 flighting of auger 141
148 shaft of auger 141
149 threaded fittings for securing pipes 125 to duct 142
151 ball float valve
152 ball retainer cage
153 ball of ball float valve 151
160 blades in quiet zone 130
210 filter apparatus of the third embodiment of the present invention
230 tank (stainless steel or fiberglass, e.g.)
231 end wall of tank 230
232 V-shaped bottom of tank 230
233 curved top of tank 230
234 side wall of tank 230
235 compartment of tank 230
310 filter apparatus of the fourth embodiment of the present invention
330 tank
335 compartment of tank 330
350 partition in tank 330
410 filter apparatus of the preferred embodiment of the present invention
415 quiet zone of tank 430
418 mixing zone of tank 430
419 filter zone of tank 430
422 effluent pipes
425 influent pipes
426 influent direction-altering pipes
427 funnel
428 exit troughs
429 exit screens
430 tank of apparatus 410 (stainless steel or fiberglass, e.g.)
431 cylindrical wall of tank 430
432 flat bottom of tank 430
435 open top of tank 430
440 conveyer means
442 counter-direction friction duct
443 exit vents in the bottom of duct 442
445 deflector cone
510 reactor
515 settling zone 518 mixing zone
522 pipes
526 inlet nozzle
527 flange
528 multi-directional effluent distribution unit (MEDU)
529 media screen
530 reactor vessel
531 outer walls
535 top of the reactor vessel 530
539 supplemental inlets
542 down tube
544 V-notches
570 solids capturing media
585 drain port
590 screen frame
592 influent centering lock collar

DETAILED DESCRIPTION OF THE INVENTION

FIG. 1 shows a first embodiment of the present invention, filter apparatus 10.

Filter apparatus 10 includes a tank 30 having a cylindrical wall 31, a conical bottom 32, and a conical top 35 (which can be considered a filter media control cap, as will be described further). Tank 30 has a waste outlet 33 at the bottom thereof. There is a valve 34 for controlling flow out of waste outlet 33.

In tank 30 there is a fluid 21 (e.g., water) to be filtered and a buoyant filter media 11 (preferably polypropylene or polyethylene) with which to filter the fluid.

Tank 30 includes a mixing zone 18 where particulates 16 and the filter media 11 mix, a filter zone 19 where particulates 16 become trapped in the filter media 11, and a quiet zone 15 where particulates 16 to be filtered out of fluid 21 can settle.

Fluid enters through exit holes 27 in an influent ring 26, which is supplied fluid from influent pipe 25. Fluid exits tank 30 through effluent pipes 22. Effluent pipes have a filter area 23 for preventing filter media 11 from exiting therethrough with fluid 21.

There is a conveyer means 40 for moving filter media 11 in a direction counter to the direction of flow of fluid 21 through tank 30, from the top of the filter zone 19 to quiet zone 15. Conveyer means 40 could comprise, for example, a plunger pump or a propeller pump, but in the first embodiment of the present invention it comprises an auger 41. Conveyer means 40 includes auger 41 and a counter-direction friction duct 42 containing auger 41 (suitable means, not shown, secure duct 42 within tank 30). There is a motor 45 (preferably variable-speed) for turning auger 41.

Duct 42 includes an entrance 44, a closed bottom 46, and exit holes 43 adjacent the bottom 46 of duct 42. Exit holes 43 are preferably as open as possible to prevent clogging.

Auger 41 includes a shaft 48 and flighting 47 attached to shaft 48.

A pump 24 pumps water from fish tank 50 to tank 30.

In operation, a sufficient quantity (such as 80–100 cubic feet when tank 30 has a volume of 120–150 cubic feet) of buoyant filter media 11 (preferably polypropylene or polyethylene beads having an average diameter of approximately 3/32–1/8 inch) is placed in filter apparatus 10 of the first embodiment of the present invention. Fluid 21 (e.g., water) to be filtered enters tank 30 via influent pipe 25, influent ring 26, and exit holes 27 in influent ring 26. Fluid 21 moves into mixing zone 18 where particulates 16 and the filter media 11 mix. Fluid 21 then moves into filter zone 19 where particulates 16 in fluid 21 become trapped in the filter media 11. After passing through filter zone 19, fluid 21 passes through the filter area 23 of effluent pipes 23 and passes out of tank 30.

While fluid 21 is passing from the influent pipe 25 through tank 30 and out of effluent pipes 23, the filter media 11 is being moved in the opposite direction by conveyer means 40. Conveyer means 40 includes an auger 41 (preferably 6" or 9" diameter Helicoid Conveyer Screw), a counter-direction friction duct 42 containing auger 41 (suitable means, not shown, secure it within tank 30), and a motor 45 (preferably variable-speed) for turning auger 41. Duct 42 includes an entrance 44 and exit holes 43 in the closed bottom 46 thereof. Auger 41 includes flighting 47 attached to a shaft 48. Conveyer means 40 pulls filter media 11 downward (upstream) from the top (downstream side) of filter zone 19 to quiet zone 15 of tank 30, where the filter media 11 and particulates 16 separate, with particulates 16 settling to the bottom of tank 30 in the quiet zone 15, and filter media 11 floats upward into the mixing zone 18. When a sufficient quantity of particulates 16 has accumulated in the conical bottom 32 of tank 30, valve 34 of waste outlet 33 is opened to allow them to exit tank 30.

Conical top 35 of tank 30 (filter media control cap) contains the filter media 11.

Pump 24 pumps water from fish tank 50 to tank 30.

Figure 4:
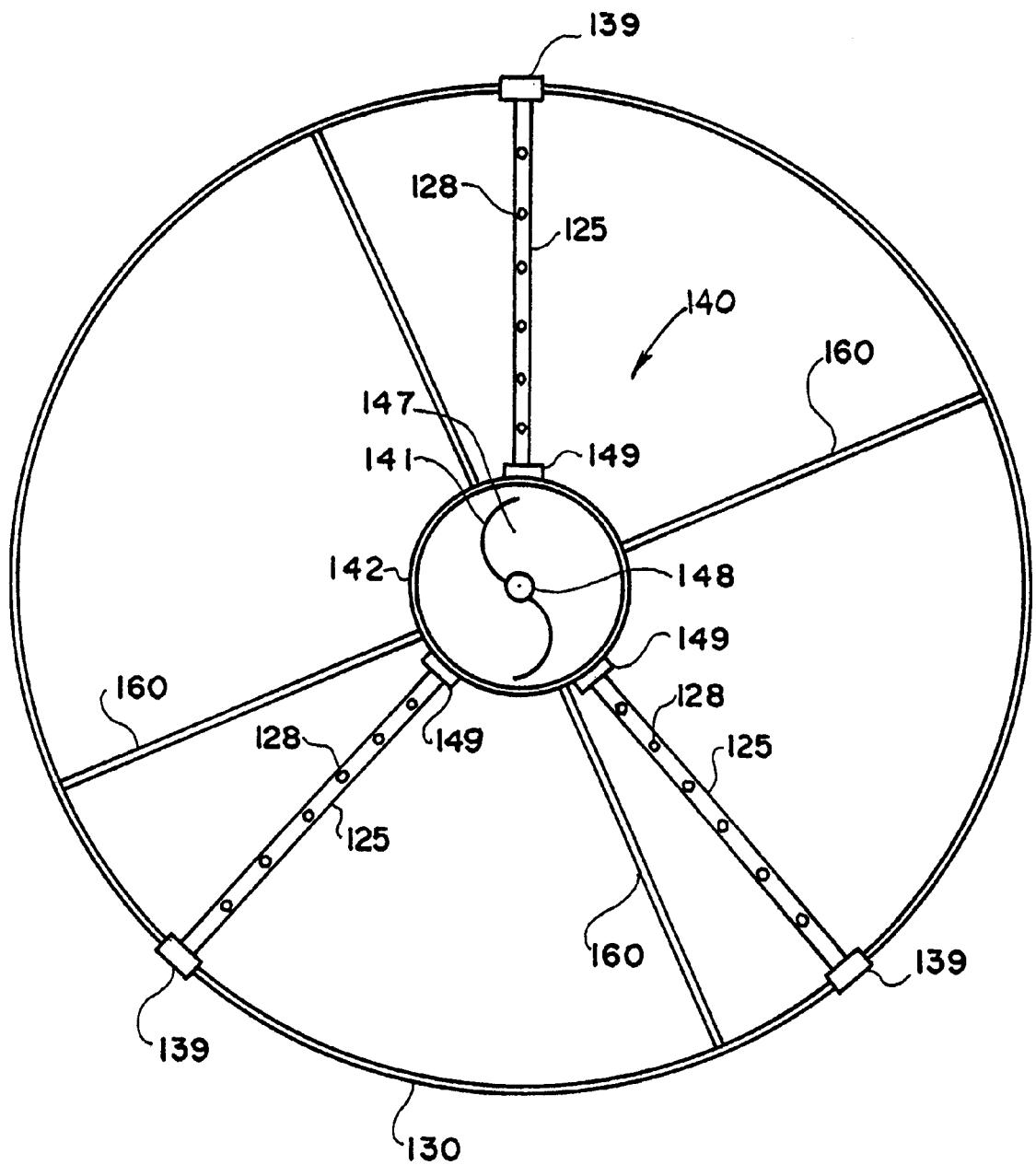
FIG. 4 is a sectional view of the second embodiment of the apparatus of the present invention.
Figure 11:
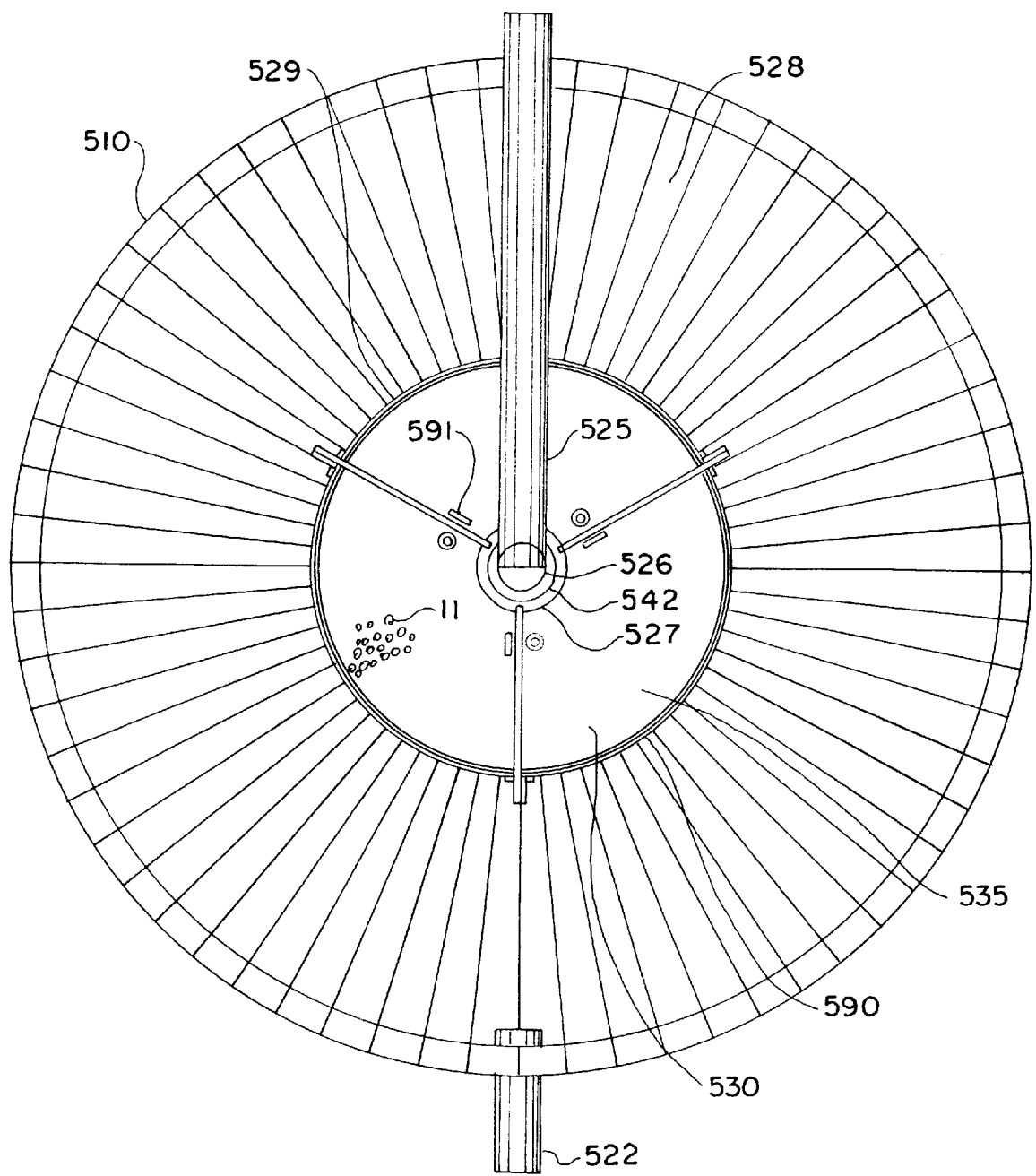
FIG. 11 is a top view of the embodiment of FIG. 9.

Filter apparatus 110, the filter apparatus of the second embodiment of the present invention, is shown in FIGS. 3 and 4. Filter apparatus 110 includes a tank 130 having a cylindrical wall 131, a conical bottom 132, and a dome-shaped top 135. There is a quiet zone 115 in tank 130, a mixing zone 118 where particulates 16 and the filter media 11 mix, and a filter zone 119 where particulates 16 become trapped in the filter media 11. Adjacent conical bottom 132 of tank 130 is a waste outlet 133 having a valve 134. There are four blades 160 in quiet zone 130 to help make zone 130 even quieter (i.e., less turbulent).

There is a conveyer means 140 for conveying filter media 11 from the top of tank 130 to quiet zone 115. Conveyer means 140 comprises an auger 141, a counter-direction friction duct 142 containing auger 141, and a motor for turning auger 41 (preferably variable-speed—not shown, but it can be the same as motor 45). Duct 142 includes entrance vents 144 adjacent the top thereof, a closed bottom 146, and exit vents 143 in the bottom thereof.

There is a nylon bearing plate 137 adjacent the closed bottom 146 of duct 142 which closes the bottom 146. There is a stuffing box plate 138 adjacent the top of duct 142.

Threaded fittings 149 secure influent pipes 125 to duct 142, while threaded fittings 139 secure pipes 125 to tank 130. Influent pipes 125 may comprise schedule 40 PVC or stainless steel. There are exit holes 127 in influent pipes 125, with nozzles 128 in exit holes 127.

Auger 141 includes a shaft 148 and flighting 147.

There are a plurality of outer effluent pipes 122 (four, for example), with each pipe 122 having disposed therein an inner strainer slide pipe 124. Each pipe 124 includes a filter area 123 which projects downwardly into tank 130 out of outer effluent pipe 122.

Adjacent the bottom of each pipe 124 is a ball float valve 151. Ball float valve 151 includes a ball retainer cage 152 and a ball 153. The openings in cage 152 are large enough to allow filter media 11 to pass therethrough but small enough that ball 153 cannot.

In operation, a predetermined quantity of filter media 11 is placed in tank 130. Fluid 21 enters tank 130 through pipes 125 adjacent quiet zone 115, and is directed upward through nozzles 128 in exit holes 127 in pipes 125. Particulates 16 entrained in fluid 21 mix with filter media 11 as fluid 21 and filter media 11 move toward the top of tank 130. Filtered fluid exits tank 130 through cages 152 and pipes 122. Filter media 11 and particulates 16 that reach the top of tank 130 are drawn into duct 142 through entrance vents 144 by auger 141. Auger 141 conveys filter media 11 and particulates 16 downward through duct 142 and out of duct 142 through exit vents 143 into quiet zone 115. In quiet zone 115 filter media 11 and particulates 16 separate, with particulates 16 settling to the bottom of tank 130 and filter media 11 rising through the mixing zone 118 to filter zone 119.

Ball float valve 151 closes off fluid flow to effluent pipes 122 when it is desired to clean inner effluent pipe 124. When inner effluent pipe 124 is pulled upward in outer effluent pipe 122, buoyant ball 153 rises and seats against the bottom of outer effluent pipe 122, cutting off fluid flow from tank 130 into outer effluent pipe 122. Because there are a plurality of outer effluent pipes 122 and inner effluent pipes 124, it is possible to clean inner effluent pipes 124 without stopping the flow of fluid through tank 130. Inner effluent pipes 124 can be cleaned individually by pulling them upward and allowing buoyant balls 153 to rise and seat against the bottom of outer effluent pipes 122. As long as one inner effluent pipe 124 is in operation, the others can be shut down and cleaned, though it is preferable to have as many inner effluent pipes 124 as possible operating at one time to allow maximum flow rate of fluid through tank 130.

Because of the filter media 11 being constantly rejuvenated by conveyer means 140, and because inner effluent pipes 124 can be cleaned individually without stopping fluid flow through tank 130, tank 130 can be operated continuously, with the need to need for backwashing, as in other filters. This means that the apparatus of the present invention can be used for considerable periods of time (for example, several months) without any down time due to backwashing.

Conical top 35 of tank 30 could be replaced with a cap which only controls the filter media 11, and which does not control fluid flow. A top for tank 30 would be positioned above such a cap. The cap could be, for example, either dome or cone shaped.

A baffle could be provided adjacent the bottom 32 of tank 30 to make quiet zone 15 even quieter.

Impurities to be filtered out with the system of the present invention could be less dense than the fluid being filtered, in which case the filter could be turned upside down and a filter media denser than the fluid could be used (e.g., if floating impurities are to be filtered out of water, the filter would be turned upside down and sand could be used as the filter media).

As can be seen, the top of the tank could be various shapes, including dome shaped or cone shaped.

Tanks 30 and 130 could be partitioned and several augers could be used to move filter media from the top (downstream end) of the tanks to the bottom (upstream end).

The present invention can be used for waste water treatment, solid removal, livestock use (for example, to clean waste water), and particle removal. Bacteria grows on bed particles.

Particles less dense than water float upward, and particles more dense settle.

All piping could be plastic or stainless steel, for example.

Tanks 30 and 130 could be insulated so that they could be used outdoors, for example.

In tank 130, effluent means other than effluent pipes 122, 124, and ball float valve 151 could be used—the primary advantage of the effluent means disclosed herein is that it is possible to clean the individual effluent means without shutting down the filtration process, thus allowing continuous filtration.

The third embodiment of the present invention, filter apparatus 210, is shown in FIG. 5. Filter apparatus 210 includes a tank 230 having two end walls 231, two side walls 234, a curved top 233, and a V-shaped bottom 232. Internal partitions (not shown in FIG. 5) divide tank 230 into four compartments 235. Each compartment 235 includes a conveyer means 140 and filter media 11, and contains the same elements and can work, for example, in the same manner as apparatus 110. The plurality of individual compartments 235 are not in fluid communication with one another unless one connects the effluent of one compartment to the influent of another to make a multi-stage filter apparatus. Otherwise, the filters can filter water from various sources without there being any fluid contact between the sources; this can be useful when one wishes to avoid spreading disease from tank to tank on a fish farm.

The filter apparatus of the fourth embodiment of the present invention, filter apparatus 310, includes a tank 330 divided by a partition 350 into a plurality of compartments 335. Each compartment 335 includes a conveyer means 140 and filter media 11 and contains the same elements and can work, for example, in the same manner as apparatus 110. Tank 330 could be, for example, the same shape as tank 130.

FIGS. 7 and 8 show the filter apparatus 410 of the preferred embodiment of the present invention. Apparatus 410 includes a tank 430 having a cylindrical wall 431, a flat bottom 432, and an open top 435. Apparatus 410 also includes a conveyer means 440 including a counter-direction friction duct 442, funnel 447, influent direction-altering pipes 426, and a deflector cone 445.

Water enters tank 430 via influent pipes 425. The water is then directed downward into counter-direction friction duct 442 via influent direction-altering pipes 426. The water entering duct 442 via pipes 426 causes a suction at funnel 427, drawing water, filter media 11, and particulates 16 into duct 442. The water, filter media 11, and particulates 16 pass through duct 442 and are deflected by deflector cone 445 through exit vents 443 in the bottom of duct 442 into quiet zone 415. In quiet zone 415 filter media 11 and particulates 16 separate, with particulates 16 settling to the bottom of tank 430 and filter media 11 rising through the mixing zone 418 to filter zone 419.

Adjacent open top 435 of tank 430 are a plurality of exit screens 429 which allow the water in tank 430 to overflow therethrough. The water then enters exit troughs 428 and then flows into effluent pipes 422 attached to troughs 428. Having the water exit by overflowing through exit screens 429 prevents build-up of pressure in tank 430 which could otherwise occur if tank 430 instead merely had effluent pipes. Also, the water is exposed to air as it overflows through exit screens 429, causing the water to become oxygenated and to get de-gasified (particularly, excess carbon dioxide is removed from the water).

Further, because the top 435 of tank 430 is open, and the filter media 11 thus rises out of the water, the bacteria riding on the filter media gets oxygen as the beads it is riding on rises out of the water into the air. Also, the open top 435 of tank 430 is advantageous in that it prevents excessive compaction of the filter media 11 because there is nothing restricting the rise of the filter media 11 in tank 430; in filter systems where buoyant filter media can only rise a limited amount, the buoyant filter media tends to compact and suffer from the channeling problems discussed earlier.

Effluent pipes 422 leading from exit troughs 428 can be directed to different fluid tanks (not shown). Individual exit troughs 428 could be replaced by a single trough completely encircling tank 430, with either a single or multiple effluent pipes leading from the single trough. For example, a trough, such as in U.S. Pat. No. 4,743,382, could be used below the screens 429 on the outside of filter tank 430 to catch and direct the water.

Filter media 11 can have, for example, a density of 90% that of water. In such a case, approximately 10% of the media will project upwardly out of the top of the water in tank 430. Thus, the top of tank 430 should project above the bottom of screens 429 at least an amount sufficient to contain any media which will rise above the surface of the water (the bottom of screens 429).

An advantage of tank 430 is that the volumetric capacity of the effluent means is variable and always exceeds the volumetric capacity of the influent means. Water simply rises in tank 430 until the water coming in through the influent means can exit with minimum resistance through the effluent means (including screens 429).

There can be a skimming device (not shown) with a brush to scrape filter media off of screens 429 and to clean the screens 429.

Conveyer means 440 has some advantages over conveyer means 140, primarily in that it has no moving parts, which could break. It may also be more fuel-efficient. However, a filter incorporating conveyer means 440 is less versatile than one using conveyer means 140, as the rate of flow of filter media through duct 442 is dependent upon the rate of flow of water through filter apparatus 410 (at least in the situation shown in FIGS. 7 and 8, where the only influent is through the conveyer means 440).

The main purpose of the filter apparatus of the present invention is to keep the dissolved and suspended solids in the water in a bacteria bed as long as possible for nitrification and to convert them to settleable solids. A settling filter could be used in series with and upstream of the apparatus of the present invention to settle out settleable solids.

Depending upon the rate of flow of filter media through the conveyer means of the filter apparatus of the present invention, different results can be obtained. When there is no flow (static cycle—not possible with filter apparatus 410), all filter media forms part of the filter bed, and the bed therefore becomes thicker and traps more solids and bio-flocculation (bio-floc) builds up on the bed.

When the filter media is cycled relatively slowly through the conveyer means, solids and bio-floc settle out relatively easily.

When the filter media is cycled at a medium speed through the conveyer means, there is some settling of solids and bio-floc and at the same some fluidizing of the bed.

When the filter media is cycled at a relatively high speed through the conveyer means, the filter bed is fluidized and the filter media is constantly rejuvenated.

The filter apparatus of the present invention settles solids, causes the water to undergo a nitrification process, de-gasifies the water, and oxygenates the water.

While all embodiments of the present invention settle solids and cause the water to undergo a nitrification process, filter apparatus 410 is especially efficient in de-gasifying and oxygenating the water.

To achieve better oxygenation of the water, one can add some auxiliary aeration means to the filter apparatus of the present invention. Adding auxiliary aeration means to tank 30 or tank 130 will help to keep the filter media beds in those tanks from compacting. The auxiliary aeration means could inject either air of oxygen bubbles. The gas would preferably be injected above the bottom of the conveyer means.

The filter apparatus 410 of the present invention provides: continuous cleaning; practically unlimited flow-through (influent, effluent), which maximizes oxygen and degasification; the overflow weir shroud adds oxygen, splash zone, shields; the overflow weir strips effluent of gas (carbon dioxide etc.); maximum use of bio-mass due to cycling of total bed; even distribution of all particulates in rising bed; solids removal/capture/harvest (settleable, suspended, dissolved); minimum vessel pressure which promotes low head; variable speed bed cycling (static, slow, medium fast cycle); bio bed porosity continuously kept open; control of tunneling of bed by cycling continuously; maximizing of bio bed by allowing non-settleable flow to be evenly placed back in bed until bio flow mass increases to settleable proportions; bacteria air contact zone; fluidized bed zone; submerged bed zone; centrifugal pump and weir/influent injector vortex flow combination which allows maximum capacity flow to allow large applications, such as aquaculture and water treatment.

The counter direction friction duct (CDFD) cycles, separates (by friction) bio bead particulates, evenly disperses particulates in bed, aerates, provides movement, directs solids settled, bead casting (deflector zone).

Apparatus 410 allows the bio filter to operate hydraulically as well as mechanically (centrifugally pump), which is an economical energy feature.

Additional features could include: a lighted clear shroud on the outside of screens 429 to produce algae to remove nutrients from effluent water and produce algae for certain species of fish to eat; heated shroud overflow weir configurations to retain heat and heat water with Electricity/Gas/Microwave/Steam Energies; rotating shear angle rake with screen cleaning brush to prepare the upper bio bed wet beads as to shear off into open end of CDFD; insulated walls of the filter to hold heat in cold weather; heat coils in filter insulated walls to hold constant temperature.

A-1 AQUACULTURE CONTINUOUS CLEANING MULTI-FUNCTIONAL BIOFILTER

The CCMB is a hydrodynamically driven, expandable-media 11, non-clogging, self cleaning, biological reactor primarily designed for the chemical reduction of inorganic nitrogen (nitrification) in water. This water, containing inorganic nitrogen, may include, but is not limited to, aquacultural culture water, and domestic wastewater.

The reactor 510 preferably contains the following components illustrated in FIG. 1 for proper operation:

reactor vessel 530;
media 11;
media screen 529;
inlet nozzle 526;
flange 527, and;
down tube 542.

Reactor Vessel 530

The purpose of the reactor vessel 530 is simply to retain the water being treated and the cycling media 11. The reactor vessel 530 may be any shape so long as it can contain water and is open to the atmosphere at its top 535.

Media 11

Since fixed-film bacteria are utilized in this nitrifying process, a surface must be provided for colonization. In order to maximize the efficiency of the reactor 510, the surface area to volume ratio must be maximized. This is best achieved through the use of granular media 11.

The granular media 11 employed in this reactor is less dense than water and expandable. Both of these characteristics are critical to the media's 11 ability to cycle properly within the reactor.

The media 11 provide a second function in that, as it continuously cycles through the reactor, the media 11 clean the reactor 510 and screen 529 surfaces of excess biomass.

Media Screen 529

Around the perimeter of the opening at the top of the reactor vessel 530 is a static screen 529. The purpose of this screen 529 is to retain the cycling media 11 as the treated water exits the reactor vessel 530. The screen 529 is usually vertical, however it may be mounted so that it makes any angle to the horizontal other than zero. The media screen 529 is supported by a screen frame 590.

Inlet Nozzle 526

Inlet water passes through an inlet nozzle 526 before entering the reactor. The inlet nozzle 526 is supported by the screen frame 590. The purpose of the nozzle 526 is to regulate the velocity of the inlet water. The velocity of the inlet water must be such that its passage through the flange 527 causes a reduction in pressure at the flange 527 opening and a lowering of the water level in the flange 527 (venturi effect). It is the force exerted by the inlet stream created by the inlet nozzle 526 which provides the driving force for the entire reactor 510.

Flange 527

The flange 527 is mounted below the top opening 535 of the reactor vessel 530 and immediately above the down tube 542. The flange 527 is supported by adjustable support rods 591 which are connected to the screen frame 590. The flange 527 provides many functions to the operation of the reactor 510. The flange 527 provides a restriction to the media 11 as the media 11 rise along the outer walls 531 of the reactor 510, resulting in a compacting of the media 11. V-notches 544 along the flange 527 perimeter allow water (recycled) from within the reactor 510 to rush into the flange 527 to fill the void created by the lowered water level created by the velocity of the inlet water. As this water rushes into the flange 527, the floating media 11 flow into the flange 527 on top of this recycled water. It is this precise combination of restriction (causing compaction of the media 11) and weir effects which forces the media 11 to rise completely out of the water before sliding (by gravity) into the flange 527.

There exists a critical venturi effect which can not be exceeded without causing such a reduction in pressure at the flange 527 that air is sucked down into the down tube 542. This critical venturi effect is controlled by positioning the flange 527, via the adjustment rods 591. Should this situation occur, the rising air bubbles will cause the rising media 11 to fluidize and expand. Thus the media 11, without the necessary compaction, will continue to cycle, however without rising out of the water.

Down tube 542

The down tube 542 provides a barrier between the expanded media 11 continuously being pushed down by the inlet/recycled water mixture and the compressed media 11 continuously rising up in the reactor 510. The length of the down tube 542 may be varied to produce the desired effect. A down tube 542 which terminates above the media 11 level will reduce the velocity of the downward moving media 11, as this media 11 must push through a thickness of upward moving media 11, thus decreasing the distance that the downward moving media 11 must travel before its buoyancy causes a direction reversal. Conversely, a down tube 542 which terminates below the media 11 level will not restrict the velocity of downward moving media 11. The significance of these two methods is explained in the section on settling zone 515.

Optional Components

The following optional components may be incorporated into the reactor system 510:

multi-directional effluent distribution unit (MEDU) 528;

solids capturing media;

supplemental inlets 539;

flow control valves;

pressure release valve;

one-way valves, and;

drain port 585.

Multi-directional Effluent Distribution Unit (MEDU) 528

Should the CCMFB 510 be operated outside of a fish culture tank or if the CCMFB's effluent should need to be directed to remote locations, a multi-directional effluent distribution unit (MEDU) 528 can be installed adjacent to the media screen 529. As water exits the reactor through the media screen 529 it is caught in the MEDU 528 from which it may be directed to any location by gravity and through pipes 522 or troughs.

Solids Capturing Media 570

The size and shape of the MEDU 528 may be varied so that it may contain any variety of solids capturing media. This feature will allow the capture of waste-solids 16 or bacterial biomass which may escape the CCMFB 510.

Supplemental Inlets 539

While the driving force of the inlet water stream powers the continuous cycling of the media 11 within the CCMFB 510, it may be necessary to flow greater quantities of water through the reactor 510. Since increasing the flow rate through the inlet nozzle 526 would increase the venturi effect mentioned previously, supplemental inlets 539 may be installed below the media 11 level. The supplemental water streams are directed such that they are horizontal and tangent to the down tube 542. These supplemental water streams cause: an insignificant reduction in reactor performance; a slight rotation of the media 11, greater compaction of the rising media 11; an increase in the reactor vessel 530 pressure; an increase in the water level above the reactor vessel 530; and an increase in the distance that the media 11 travels out of the water.

Flow Control Valves

The addition of adjustable flow controlling valves to the inlet 525 and supplemental 539 lines allows the rate at which the media 11 continuously cycles to be varied. By increasing the flow rate through the supplemental inlet 529 line the media 11 compacts further and the cycling velocity decreases. Additionally, the water level above the flange 527 increases and the flow rate through the inlet nozzle 526 can be increased without sucking air and "blowing" the rising media bed.

Pressure Release Valve 582

Should the inlet water to the CCMB 510 become temporarily interrupted, the media 11 (being less dense than water) may float into the inlet nozzle 526. Once flow is restored the media 11 may become trapped and partially clog this orifice. To avoid this problem, the water supply line 525 may be fitted with a pressure release valve immediately before entering the reactor. This valve automatically opens when flow is interrupted. As the pressure release valve opens, water flows out of the nozzle 526 thus preventing media 11 from floating into the supply line 525.

One-way Valves

Should the inlet lines 525, 539 be broken, water and media 11 may flow from the CCMB 510. The addition of one-way valves on the supply lines 525, 584 will prevent this from occurring.

Drain Ports 585

Drain ports 585 may be installed on the reactor vessel 530 to facilitate removal of water or media 11 for transport purposes. The water drain 585 is typically located at the bottom of the reactor vessel 530. Media drain(s) may be located along the side wall 531 of the reactor vessel 530, usually toward the top 535 so that the media 11 may be floated out.

The water drain port 585 located at the bottom 532 of the reactor vessel 530 may serve another function for the periodic removal of biomass or particulates 16 which accumulate on the bottom 532 of the reactor vessel 530.

PROCESS DESCRIPTION

Physical

Water

Typically, water enters the CCMB 510 through both the inlet nozzle 526 and one supplemental supply line 539. Water entering the CCMB 510 through the inlet nozzle 526 passes through the flange 527 creating a venturi effect and is mixed thoroughly with expanded media 11 and recycled water which raises its dissolved oxygen content. The force of the inlet water carries this mixture down the down tube 542 where it impinges upon a layer of media 11. The combination of this collision, together with the velocity reduction caused by the sudden increase in cross sectional area results in a velocity drop to nearly zero.

As soon as the inlet/recycled water mixture clears the bottom of the down tube 542 it mixes with the water entering via the supplemental supply line and begins to travel towards the top of the reactor vessel 530 where it encounters media 11 which is floating upward. The water flows faster than this compacted media 11 and thus passes through the media 11 until it reaches the top. As the water reaches the top of the reactor vessel 530, it is divided three ways.

The largest portion of the flow nearest the outer wall 531 of the reactor vessel 530 flows over the edge of the reactor vessel 530 through the screen 529 and is aerated and stripped of waste gasses (degassed).

The next largest portion of water, nearest the flange 527, flows through the v-notches 544 of the flange 527 where it rushes to fill the void created by the venturi effect of the inlet water. In the process of flowing through the v-notches 544, this water is also somewhat aerated and degassed. This water then mixes with the inlet water and falling media 11 and again completes the continuous loop.

The third and smallest portion of water is entrapped within the compressed media 11 matrix (via viscous forces) as the media 11 raises out of the water. It is at this point that the entrapped water trickles down through the media 11, providing the majority of aeration and degassing. The majority of this water flows out of the CCMB 510 through the screen 529, however some flows back down into the flange 527 and continues to cycle.

Media 11

Since no media 11 enters or leaves the CCMB 510 we will, for convenience sake, name the flange 527 as the starting point of the continuous cycle.

Fluidized expanded media 11 continuously falls into the flange 527 where it is first sucked through the flange 527 (venturi action) and then pushed through the down tube 542 by the force of the inlet water stream. As the media 11 is pushed through the down tube 542 it experiences high turbulence and rapid mixing with both the inlet and recycled water streams.

Upon exiting the down tube 542, the media 11 collides with a layer of rising and/or hovering beads called a mixing zone 518 whereupon its kinetic energy, momentum, and velocity is greatly reduced. Freed from the water stream which has now curled back up the outside of the down tube 542, the media 11 hovers in a settling zone 515 as its buoyancy begins to cause an upwards floatation. As this media 11 hovers, more media 11, rushing out of the down tube 542, crashes into it and pushes it out from beneath the down tube 542. After moving from beneath the down tube 542 the media 11 encounters the water entering the CCMB 510 tangentially via the supplemental inlet 539 and is swirled slightly.

Buoyant forces now push the media 11 upward and between the walls 531 of the reactor vessel 530 and the down tube 542. Meeting a layer of compressed media, the expanded media begins to be compressed itself as water rushing past it, forces it tighter and more media 11 continuously floats up and underneath it. This compressed media is now forced upward as a solid plug (no mixing) by buoyant forces and the force exerted by the water rushing through it forming a filter zone 519. The plug of compressed media continues to move up and is compressed further as it passes the reduced cross sectional area (restriction) caused by the flange 527 (compaction of the plug occurs when the plug passes through the reduced space between the flange 527 and the wall 531).

Immediately upon clearing the flange 527, a portion of the compressed media plug, nearest the flange 527, is expanded and fluidized by the water rushing through the V-notches 544 of the flange 527 and is itself carried over the lip of the flange 527. Once entering the flange 527, this media 11 is sucked through the flange 527 via the venturi action and continues the cycle.

The remainder of the compressed media 11 plug is now pushed completely out of the water and above the top 535 of the reactor vessel 530 by the buoyant force of the media 11 continuously rising underneath it and the force of the rising water. As the media 11 clears the top of the reactor vessel 530 it is retained in the CCMB by the static screen 529 as the majority of the water exits through the screen 529. Friction forces along the surfaces of the media 11 resist water flow and some water remains with the media 11 until gravity overcomes the skin friction of the media surfaces.

As the compressed media plug continuously rises out of the water and the portion nearest the flange 527 is continuously washed into the flange 527, the media plug takes on a funnel shape with the media 11 adjacent the static screen 529 rising the greatest distance above the reactor vessel 530. The funnel shape is completed as the top most layer of media 11 continuously breaks free of the matrix and falls into the flange 527 along an angle of repose distinct to the physical properties of the granular media 11. As the media 11 continuously falls into the flange 527 it is sucked through the flange 527 via the venturi action and continues the cycle.

Bacteria

Autotrophic nitrifying bacteria colonize the surfaces of the media 11 within the CCMB 510. The culture type can be characterized as thin film in which the biofilm is thin and always in an exponential growth phase. Any excess biomass is instantaneously sheared by the force of the influent stream or by particle to particle interactions. Sheared biomass can be settled in the settling zone 515, trapped in the solids capturing media 570, or allowed to flow into the fish culture tank. Biomass which flows into the fish culture tank continues to be active and contributes to in-situ nitrification.

Particulate Solids 16

Particulate solids 16 which flow into the CCMB 510 may be settled in the settling zone 515 and drained via the drain port 585. Solids 16 which escape the settling zone 515 encounter the filter zone 419. These solids may continue to cycle with the media 11 until they either settle into the settling zone 515, or exit through the screen 529. Solids which exit the screen 529 may become entrapped in the supplemental solids capturing media 570 contained within the MEDU 528.

COMPARISON TO OTHER NITRIFYING BIOLOGICAL REACTORS

Plate-counts have shown that despite the turbulence caused by continuous cycling, the beads are still teaming with bacteria. The theory of turbulent diffusion says that higher turbulence means thinner, more active, biofilms, but only for cells which can remain attached in the presence of high shear forces.

Why did this not happen with rotating biological contactors (RBCs)? Higher turbulence encountered at faster RBC rotational speeds causes higher nutrient and $O_2$ levels. This results in more bacteria which causes the film to grow thicker than diffusion can supply the inner cells with nutrients. Those inner cells either weaken or die. This combined with shear forces causes chunks of bacteria to slough off, settle, become anaerobic, and cause problems.

What makes the CCMB bacteria different from that of the RBC? The beads are exposed to far more shear than would ever be experienced by even an experimental RBC by the jet of water which forces the beads down the center of the filter and by the colliding beads. In this aspect the filter begins to look more like a fluidized sand filter where the biofilm stays thin and active.

What makes this filter better than a fluidized sand filter? In a fluidized sand filter up-flowing water pushes the sand particles up until gravity pulls them back down, while the water to be treated simply flows straight through and out at the top. However, in the CCMB, after the water has pushed the beads down and gravity takes over, the water to be treated stays with the beads all the way back to the top. Then as the beads rise above the waterline, some water is retained with the beads, is aerated and trickles out of the filter while another portion flows back down the center with the beads and repeats the cycle. It would be safe to say that if nutrients are in contact with bacteria for a longer period of time and under higher $O_2$ levels, then more nutrients will be used.

Another advantage of the CCMB involves particle retention and has two aspects. The first aspect is obviously media loss, a common problem with sand filters. In a fluidized sand filter, media can be lost in three ways. One, if the flow rate goes too high it can simply wash sand out. Two, when sand particles break down from constant collisions, they become smaller and with less mass are washed out. And three, when bacteria grows on a particle the surface area increases which causes more lift (a bigger sail catches more wind) which also causes particles to be washed out.

The second aspect of particle retention is what occurs in the CCMB. Plastic beads don't wear down like sand grains do. Also, because the CCMB's screen is smaller than the media, no media escapes. Additionally, all water must pass through a packed bed (which captures particles) before exiting. This, combined with the recirculating feature of the CCMB means that even the biomass that is sheared off remains within the CCMB longer than it would within an ordinary fluidized sand filter. In this aspect, the CCMB begins to look like a suspended-growth bioreactor.

Figure 12:
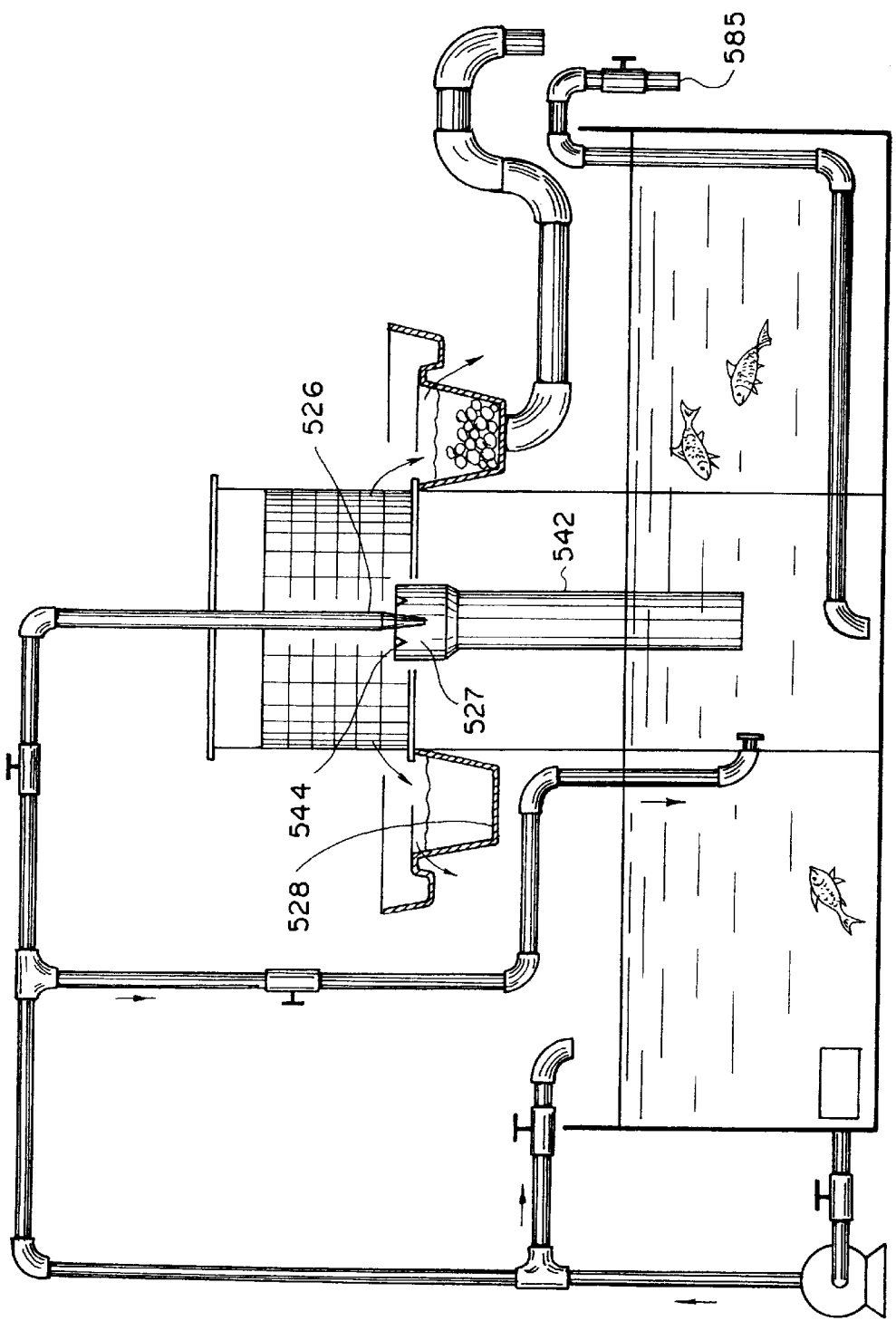
FIG. 12 is a typical in-tank installation for growing fish or other aquatic species of the filter apparatus of the present invention.

In FIG. 12, water is shown as overflowing all around the filter apparatus (360 degrees).

Figure 13:
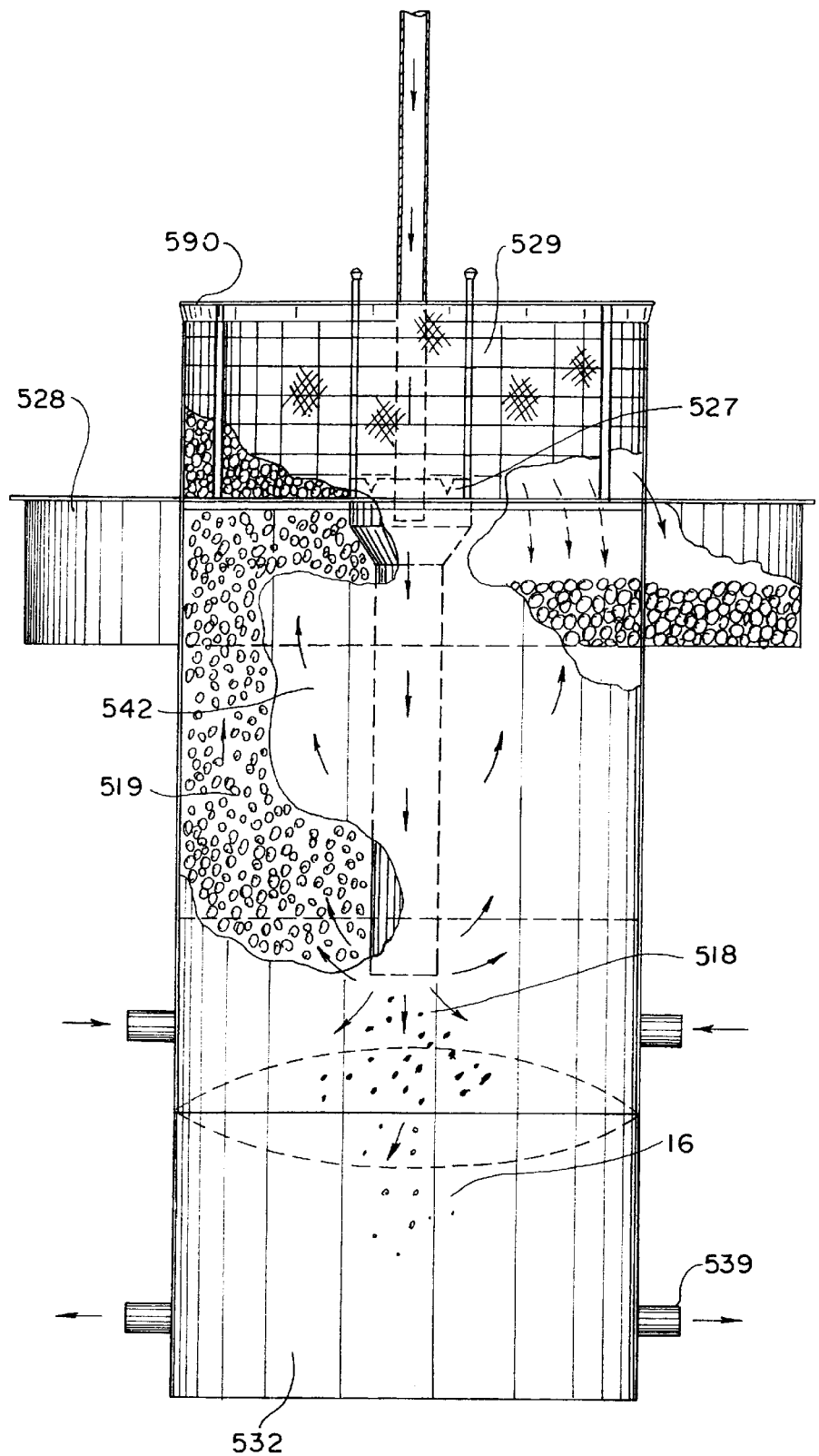
FIG. 13 is a cut-away view of the filter shown in FIG. 12.

In FIG. 13, a detail is shown in which a single influent source is used in down tube 542, as may be typical in smaller units.

Figure 15:
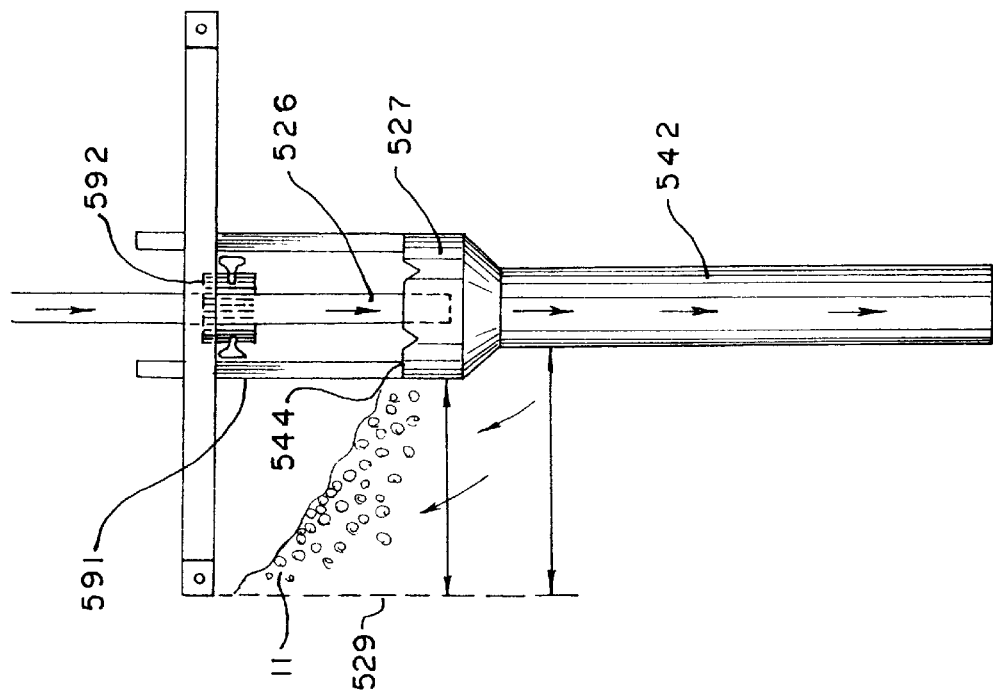
Figure 14:
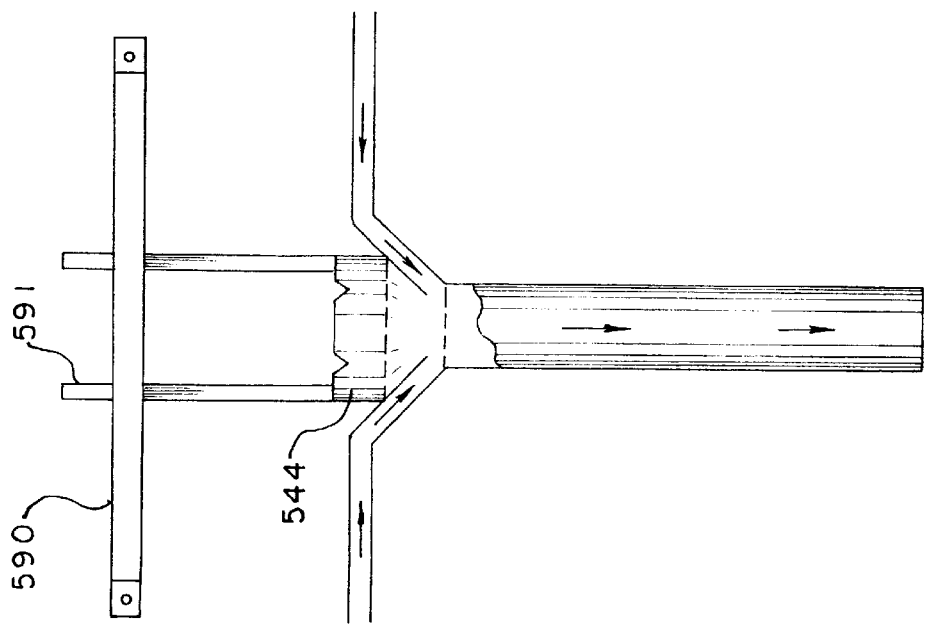

FIGS. 14 and 15 show adjustment rods 591, which are the means for adjusting the height of the counter direction friction duct. Also shown in FIG. 15 is the influent centering lock collar 592 for centering the influent pipe coming into the down tube 542. FIG. 15 also illustrates well how rising media 11 are compressed in the space between flange 527 and the call and rise up along the outer screen 529.

FIG. 16 is a top view of influent pipes 425 and adjusting rods 591. FIG. 17 shows a potential arrangement of influent pipes 526 for a large (for example, 375 plus gallons per minute, with 125 gallons per minute through each influent pipe 526) filter.

The filters of the present invention can also be used in a solid-collecting mode (in which case the down tube would be lifted to prevent the media 11 from cycling down therethrough). As the solids collect in the lower portion of the submerged bed of media 11, back pressure begins to build and water begins to belch up over the top of the flange 527 through the duct 442. At this moment, one has a down-flow solid collecting mode. As water trickles down through the beads and through the screen, solids are collected at the top of the beads. When this happens, solids will be clogging the bottom and top of the bed of media 11. At this time, the filter apparatus can be changed to a cleaning mode (normal continuous cycling mode) by lowering the down tube by adjusting rods 591. The solids would then flow through the screen into the gutter and flow from pipe 522 would be directed into a waste area, bypassing the original flow destination.

Mixer apparatus available from the Denver Mining Co. could be used for large applications.

The filter apparatus of the present invention could be filled with water and used to filter air. In the chemical industry, catalysts could be used.

The foregoing embodiments are presented by way of example only; the scope of the present invention is to be limited only by the following claims.

We claim:

1. A method of filtering fluid, comprising the steps of:
   (a) providing a tank means (30) for containing a volume of fluid (21);
   (b) introducing the fluid (21) into the tank means (30);
   (c) providing a filter media (11), buoyant in water, for filtering predetermined matter (16) out of the fluid (21);
   (d) causing the filter media to pack relatively tightly in a filter zone (19) in the tank means (30);

(e) flowing the fluid through the filter zone (19) where predetermined matter (16) in the fluid (21) becomes trapped in the filter media;

(f) flowing the filtered fluid out of the tank means (30);

(g) conveying the filter media (11) and trapped predetermined matter (16) through a vertical tube from the filter zone (19) to a quiet zone (15) where the predetermined matter (16) moves away from the filter zone (19) and the filter media (11) move in the direction of the filter zone (19);

(h) allowing the filter media (11) to move from the quiet zone (15) to a mixing zone (18) where the filter media (11) mixes with predetermined matter (16) in the fluid (21) being filtered;

(i) allowing the filter media to move above the mixing zone and out of the fluid, wherein:

at least a portion of the fluid is introduced into the tank means in the vertical tube, and the portion of the fluid introduced into the tank means in the vertical tube draws fluid, filter media which has moved out of the fluid, and particulates into the vertical tube and conveys the fluid, filter media, and particulates into the quiet zone, such that the filter media is in constant movement.

2. The method of claim 1, wherein:

the filter media (11) and trapped predetermined matter (16) are continuously conveyed from the filter zone (19) to the quiet zone (15) while fluid is being filtered.

3. The method of claim 1, wherein:

the trapped predetermined matter (16) drops to the bottom of the tank means (30) in the quiet zone (15).

4. The method of claim 1, wherein:

the predetermined matter (16) comprises particulates.

5. The method of claim 1, wherein:

the tank means includes a plurality of effluent means; and the effluent means are cleaned without stopping fluid flow through the tank means.

6. The method of claim 1, wherein:

the tank means includes a plurality of individual compartments which are not in fluid communication with one another.

7. The method of claim 1, wherein:

the filtered fluid is flowed out of the tank means (30) by allowing the filtered fluid to overflow.

\* \* \* \* \*